United States Patent
Ciobanu et al.

(10) Patent No.: US 11,131,571 B2
(45) Date of Patent: Sep. 28, 2021

(54) MAGNETIC FLOWMETER ASSEMBLY WITH GLITCH REMOVING CAPABILITY

(71) Applicant: Georg Fischer Signet LLC, El Monte, CA (US)

(72) Inventors: Calin Ciobanu, Brea, CA (US); Jeffrey Lomibao, La Puente, CA (US)

(73) Assignee: Georg Fischer Signett LLC, El Monte, CA (US)

( * ) Notice: Subject to any disclaimer, the term of this patent is extended or adjusted under 35 U.S.C. 154(b) by 63 days.

(21) Appl. No.: 16/518,108

(22) Filed: Jul. 22, 2019

(65) Prior Publication Data
US 2021/0025741 A1  Jan. 28, 2021

(51) Int. Cl.
*G01F 1/58*  (2006.01)
*G01F 1/74*  (2006.01)

(52) U.S. Cl.
CPC ............... *G01F 1/588* (2013.01); *G01F 1/74* (2013.01)

(58) Field of Classification Search
None
See application file for complete search history.

(56) References Cited

U.S. PATENT DOCUMENTS

| | | | | |
|---|---|---|---|---|
| 3,715,918 A | * | 2/1973 | Bailey | G01F 1/58 73/861.16 |
| 4,953,409 A | * | 9/1990 | Marchewka | G01F 1/60 73/861.17 |
| 5,325,728 A | * | 7/1994 | Zimmerman | A61B 5/0265 73/861.12 |
| 5,388,465 A | * | 2/1995 | Okaniwa | G01F 1/60 73/861.12 |
| 2002/0117009 A1 | * | 8/2002 | Keech | G01F 25/0007 73/861.17 |
| 2002/0145417 A1 | * | 10/2002 | Brockhaus | G01F 1/60 324/204 |
| 2005/0125168 A1 | * | 6/2005 | Brockhaus | G01F 1/60 702/45 |
| 2016/0258793 A1 | * | 9/2016 | Li | G01F 1/58 |

(Continued)

*Primary Examiner* — Harshad R Patel
(74) *Attorney, Agent, or Firm* — Harness, Dickey & Pierce, P.L.C.

(57) ABSTRACT

A system and related method is provided for correcting measurement glitches detected by a magnetic flowmeter assembly in determining a fluid flow velocity. The magnetic flowmeter assembly includes a pair of electrodes that receive an instantaneous first and second electrode potential (voltage potential), $Ue_1$ and $Ue_2$, so as to determine an instantaneous induced voltage Ue across the fluid. A signal processor sends a digital signal of the induced voltage (voltage signal Ue) to a micro-processor, which processes the signal data and computes the corresponding instantaneous fluid velocity, v. Moreover, an instantaneous glitch detection variable Um is computed based on the electrode potentials ($Ue_1$ and $Ue_2$), so as to detect the presence of measurement glitches in said electrode potentials, wherein the signal processor will provide a digital signal of Um to the micro-processor. As such, the flowmeter assembly is able to correct for the measurement glitches by manipulating the instantaneous voltage signal Ue, such that the computed and displayed fluid flow velocity is not skewed by said measurement glitches.

8 Claims, 6 Drawing Sheets

(56) References Cited

U.S. PATENT DOCUMENTS

| | | | |
|---|---|---|---|
| 2017/0160114 A1* | 6/2017 | Saito | G01F 1/586 |
| 2017/0234708 A1* | 8/2017 | Xie | G01F 25/0007 |
| | | | 73/861.12 |
| 2019/0078915 A1* | 3/2019 | Mitsutake | G01F 1/60 |
| 2020/0166392 A1* | 5/2020 | Isik-Uppenkamp | G01F 1/60 |
| 2020/0309577 A1* | 10/2020 | Feller | G01F 1/60 |

* cited by examiner

MAGNETIC FLOWMETER ASSEMBLY WITH GLITCH REMOVING CAPABILITY

INCORPORATION BY REFERENCE

In certain embodiments of the present invention, the magnetic flowmeter assembly can be configured as described and claimed in Applicant's patent applications: 1) entitled "FULL BORE MAGNETIC FLOWMETER ASSEMBLY," U.S. app. Ser. No. 16/146,090, filed Sep. 28, 2018, 2) entitled "MAGNETIC FLOWMETER ASSEMBLY HAVING INDEPENDENT COIL DRIVE AND CONTROL SYSTEM", U.S. app. Ser. No. 16/243,868, filed Jan. 9, 2019, 3) entitled "MAGNETIC FLOWMETER WITH MEDIA CONDUCTIVITY MEASUREMENT", U.S. app. Ser. No. 16/243,980, filed Jan. 9, 2019, 4) entitled "MAGNETIC FLOWMETER ASSEMBLY WITH ZERO-FLOW MEASUREMENT CAPABILITY", U.S. app. Ser. No. 16/244,060, filed Jan. 9, 2019, and 5) entitled "FULL BORE MAGNETIC FLOWMETER ASSEMBLY WITH TEMPERATURE SENSING ELEMENT", U.S. app. Ser. No. 16/271,718, filed Feb. 8, 2019, which are hereby incorporated by reference for all purposes.

FIELD OF THE INVENTION

The present invention relates generally to magnetic flowmeters for performing fluid flow measurements, and more particularly, to flowmeters capable of correcting fluid flow measurements in the presence of glitch readings.

BACKGROUND OF THE INVENTION

Magnetic flowmeters measure the velocity of conductive fluids passing through pipes by generating a magnetic field and measuring the resultant voltage. These flowmeters rely upon Faraday's Law in which the flow of a conductive fluid through a magnetic field causes a voltage signal which is sensed by electrodes and the sensed voltage is proportional to the fluid's velocity.

Magnetic flowmeter assemblies are generally either insertion mag-meters or full bore mag-meters. Insertion mag-meters typically include a sensor body which is placed into a fluid flow and electrodes which are disposed at the distal end of the sensor body. The sensor can include conductive coils that generate a magnetic field which, in combination with the fluid flow creates an electromotive force (voltage), which is then sensed by the electrodes. Full bore mag-meters typically include a tubular body disposed inline along a fluid conduit, with electrodes molded into the walls of the body and conductive coils disposed on the tubular body that generates a magnetic field across the body.

Although these flowmeters are generally effective, shortfalls exist. For example, an accurate fluid flow velocity measurement is dependent on several conditions, such as symmetrical fluid contact with the electrodes, or an electromagnetic environment that has been taken into account for accurate operation of the flowmeter. However, deviations to such conditions can occur, and thereby result in measurement "glitches", often due to sudden unwanted electronic signal, which can result in an inaccurate flow measurement. An example of a deviation includes non-symmetrical fluid contact with the electrodes, thereby affecting the resultant voltage signal measured and the corresponding fluid flow velocity calculation. Such inadequate fluid contact with the electrodes can be caused due to air pockets (bubbles) contained within the fluid flow, or due to the fluid flow splashing about within pipe, particularly during start-up flow (initial flow through the pipe). Another example of a deviation includes electromagnetic interference (EMI), or from electromagnetic compatibility (EMC) events, wherein external sources of energy, including radio frequency, can impact the flowmeter operation, e.g., affecting the circuit that generates the magnetic field, thereby impacting the fluid velocity calculated. Examples of such EMI and EMC events can be due to operation of pumps, variable flow drivers, and other heavy electrical equipment, and it can also be due to conducted or radiated noise, the electronic PCBAs, which lead to transients in the signals which are proportional to the flow.

Existing methods for correcting such measurement glitches include using post measurement flow analysis, where such large outliers in measurement data may be normalized to reduce the deviation from the recorded fluid flow rate. However, even with such normalizations, or filtering, the resulting fluid flow velocity profile may still include substantial errors, since such measurement glitches are still considered in the overall fluid flow velocity calculation.

It should, therefore, be appreciated that there remains a need for a magnetic flowmeter assembly that addresses these concerns. The present invention fulfills these needs and others.

SUMMARY OF THE INVENTION

Briefly and in general terms, the present invention provides a system and related method for detecting measurement glitches and correcting the corresponding fluid flow velocity being measured by a magnetic flowmeter assembly. The magnetic flowmeter assembly includes a pair of electrodes in contact with the fluid and that provide corresponding electrode potentials, which enable a voltage signal Ue (induced voltage) and a glitch detection variable Um to be determined. The flowmeter further includes a microprocessor configured to receive a digitized signal of Ue and Um, and is further configured to identify the presence of a measurement glitch based on a step-size change to Um. As such, the microprocessor is capable of correcting the fluid velocity calculation by manipulating the voltage signal Ue over a prescribed duration, so as to minimize or eliminate the impact of the measurement glitch.

More specifically, by example and not limitation, the microprocessor removes the voltage signal, corresponding to the glitch detection variable, from being considered for the fluid flow velocity calculation, and instead uses the voltage signal just prior to the occurrence of the measurement glitch as a gap filler. Moreover, the gap filler voltage signal may be used for a prescribed duration to minimize any residual impact to the actual voltage signal by the measurement glitch.

In a detailed aspect of an exemplary embodiment, the voltage signal and corresponding fluid flow velocity may by published on a prescribed delay, enabling the microprocessor to detect a measurement glitch, and apply corrective measures.

In an alternate embodiment, a fast analog-to-digital converter may be used to minimize the need to delay publishing the voltage signal and fluid flow velocity calculated.

For purposes of summarizing the invention and the advantages achieved over the prior art, certain advantages of the invention have been described herein. It is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention disclosed herein. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings.

DETAILED DESCRIPTION OF THE PREFERRED EMBODIMENTS

Figure 1:
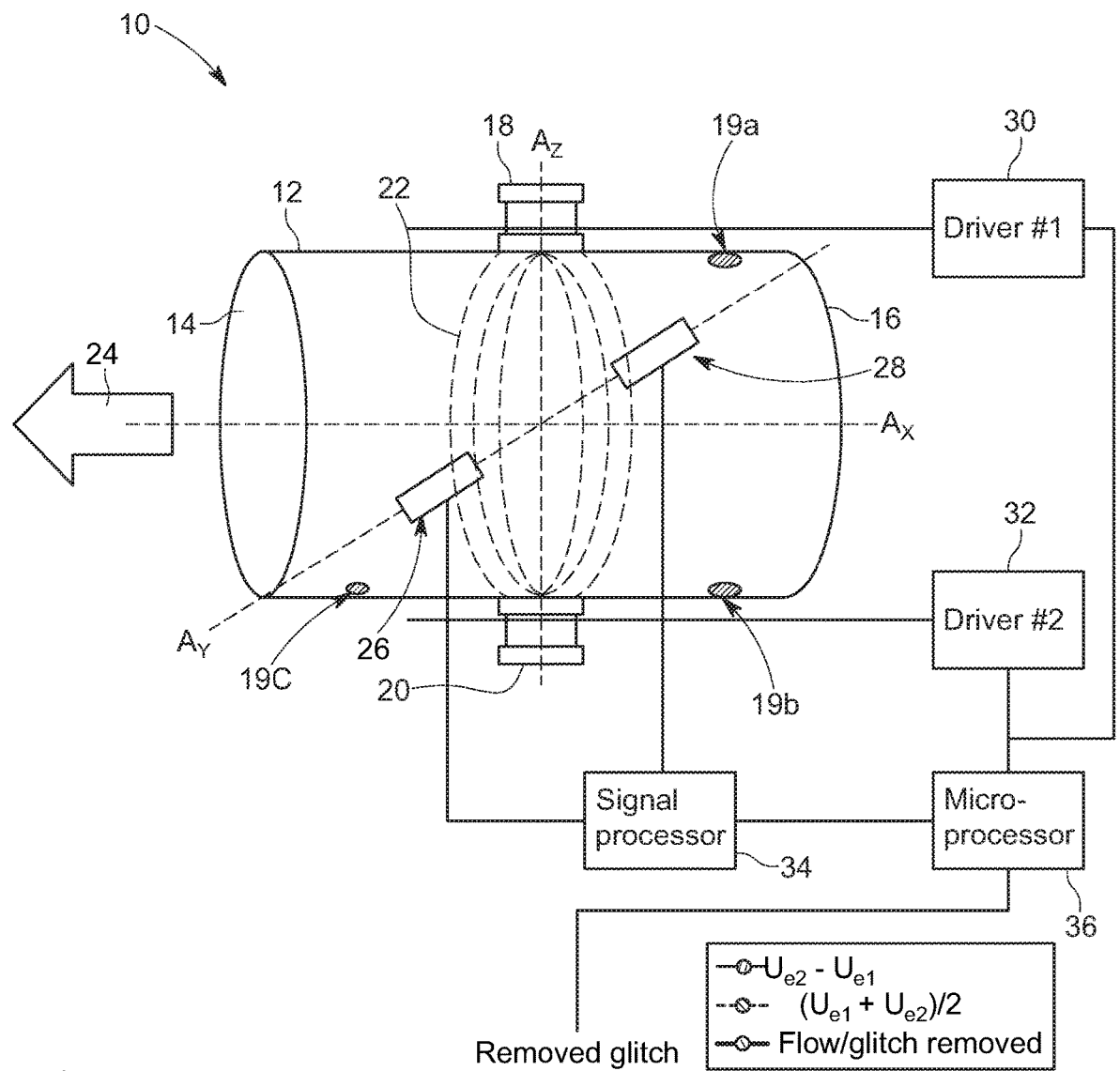
FIG. 1 is a simplified perspective view of a magnetic flowmeter assembly in accordance with the present invention, depicting a signal processor and micro-processor receiving input from a pair of electrodes.

Referring now to the drawings, and in particular FIG. 1, there is shown a system and method for correcting measurement glitches detected by a magnetic flowmeter assembly 10 in determining a fluid flow (24) velocity. The magnetic flowmeter assembly 10 includes a pair of electrodes (26, 28) that receive an instantaneous first and second electrode potential (voltage potential), $Ue_1$ and $Ue_2$, so as to determine an instantaneous induced voltage Ue across the fluid. A signal processor 34 sends a digital signal of the induced voltage (voltage signal, Ue) to a micro-processor 36, which processes the signal data and computes the corresponding instantaneous fluid velocity (v), (Ue=Ue1−Ue2). Moreover, an instantaneous glitch detection variable Um is computed based on the electrode potentials ($Ue_1$ and $Ue_2$)(Um=(Ue1+Ue2)/2), so as to detect the presence of measurement glitches in said electrode potentials, wherein the signal processor 34 will provide a digital signal of Um to the micro-processor 36. As such, the flowmeter assembly 10 is able to correct for the measurement glitches by manipulating the instantaneous voltage signal, Ue, such that the computed and displayed fluid flow velocity is not skewed by said measurement glitches.

With continued reference to FIG. 1, the magnetic flowmeter assembly 10 has a tubular body 12 (e.g., pipe) with two opposing ends 14 and 16 that are aligned along a horizontal axis (AO, and which define a fluid flow path 24 for transporting a conductive fluid. The magnetic flowmeter assembly 10 includes a pair of coil assemblies (18, 20), which are coupled to an intermediate region of the flowmeter 10, and are configured to pass a current received from at least one coil driver. The coil assemblies (18, 20) generate a magnetic field 22 within the fluid flow path 24 of the tubular body 12 via the current passing therein. The aforementioned pair of measuring electrodes (26, 28) are attached to the body 12 and configured to detect the voltage induced (Ue) by the conductive fluid passing through the magnetic field 22.

The coil assemblies (18, 20) can be externally coupled to the tubular body 12, aligned along a vertical axis (Az) which is orthogonal to the longitudinal axis (Ax). The pair of measuring electrodes (26, 28) can be aligned along axis (Ay) which is orthogonal to the longitudinal axis (Ax) and vertical axis (Az), and configured to detect the voltage induced by being in electrical communication with the fluid within the fluid flow path 24. The magnetic flowmeter assembly 10 further includes a plurality of auxiliary electrodes 19(a, b, c), including a first auxiliary electrode 19(a) and a second auxiliary electrode 19(b) that are disposed upstream of the pair of measuring electrodes (26, 28). The first and the second auxiliary electrodes are aligned with the axis (Az), on opposing sides of the pipe, such that axis (Ay) and axis (Az) are coplanar. A third auxiliary electrode 19(c) is disposed downstream of the pair of measuring electrodes (26, 28). The measuring electrodes (26, 28) and the auxiliary electrodes (19a,b,c) are each mounted to a corresponding aperture formed in the wall of the pipe 12.

Figure 9:
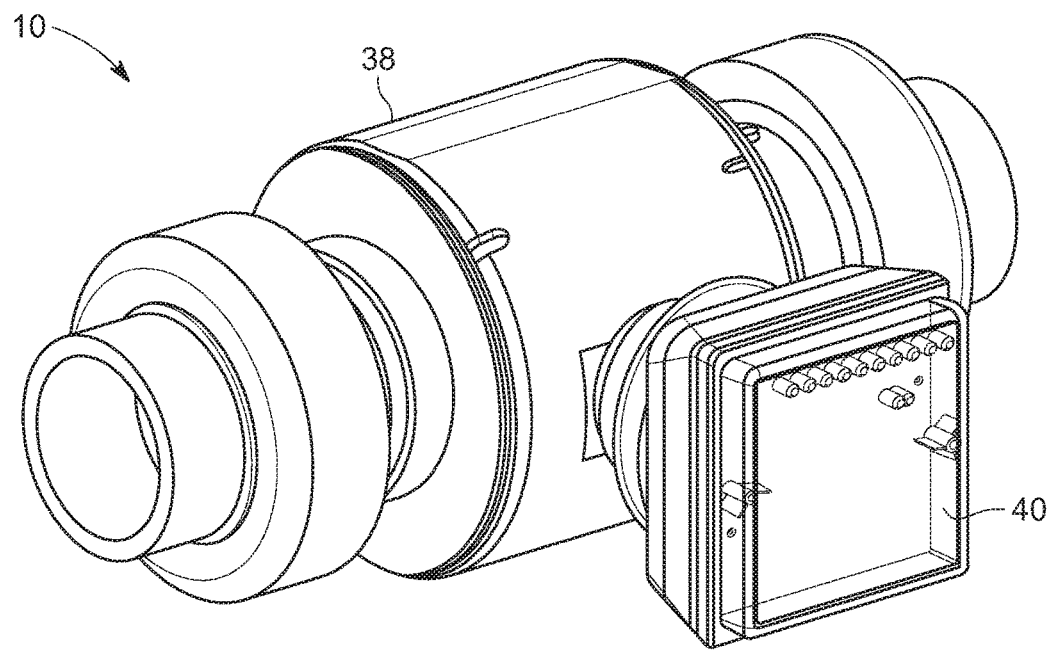
FIG. 9 is a simplified perspective view of a magnetic flowmeter assembly of FIG. 8, further comprising a shield housing and electronic assembly.

A housing is coupled externally to the tubular body 12 and is configured to hold at least one processor (signal processor 34) that is electrically coupled to the electrodes (as seen in FIG. 9). In an exemplary embodiment, the signal from each of the two measuring electrodes (26, 28) follows a signal conditioning path consisting of high sensitivity Op Amps and an adjustable Gain Instrumentation Amplifier. The voltage signal Ue is the difference between the two measuring electrodes (i.e. Ue=$Ue_2$[voltage potential of a second electrode]−$Ue_1$[voltage potential of a first electrode]). Said voltage signal Ue is further processed by a high-resolution Analog-to Digital Converter (ADC) and processor (signal processor 34). In an exemplary embodiment, a 24-bit ADC may be used. The digitally converted voltage signal is scaled and processed by a second processor (micro-processor 36) to accurately display and/or provide an output that is proportional to the fluid velocity (i.e. digital outputs, 4-20 mA analog output). Moreover, the micro-processor 36 will compute and display the corresponding fluid velocity.

In the exemplary embodiment, the output of the Instrumentation Amplifier is the input to the Analog-to Digital Converter (ADC). $Ue_1$, $Ue_2$, and Ue, are converted into digital entity by the ADC and communicated via a high speed SPI (Serial Peripheral Interface) to the microprocessor, which calculates the flow.

The magnetic flowmeter assembly 10 relies upon Faraday's Law of Electromagnetic Induction to measure the velocity of the conductive fluid in the tubular body. Specifically, Faraday's Law states that the voltage induced across any conductor that moves at right angles through a magnetic field is proportional to the velocity of the conductor.

Ue is proportional to v×B×L

Where:
Ue=induced voltage (i.e., signal voltage)
v=average velocity of conductive fluid
B=magnetic field strength
L=length of the conductor (i.e., distance between electrodes)

Alternatively, the average fluid velocity v is proportional to $$\frac{Ue}{B \times L}$$

As aforementioned, the flow of the conductive liquid through the magnetic field B creates a voltage signal Ue which can be sensed by the pair of measuring electrodes (26, 28), which in-turn can be used to calculate the velocity v of the conductive fluid. The micro-processor can be configured to publish the induced voltage and fluid velocity at specific time intervals, such as every 200 milliseconds.

Figure 2:
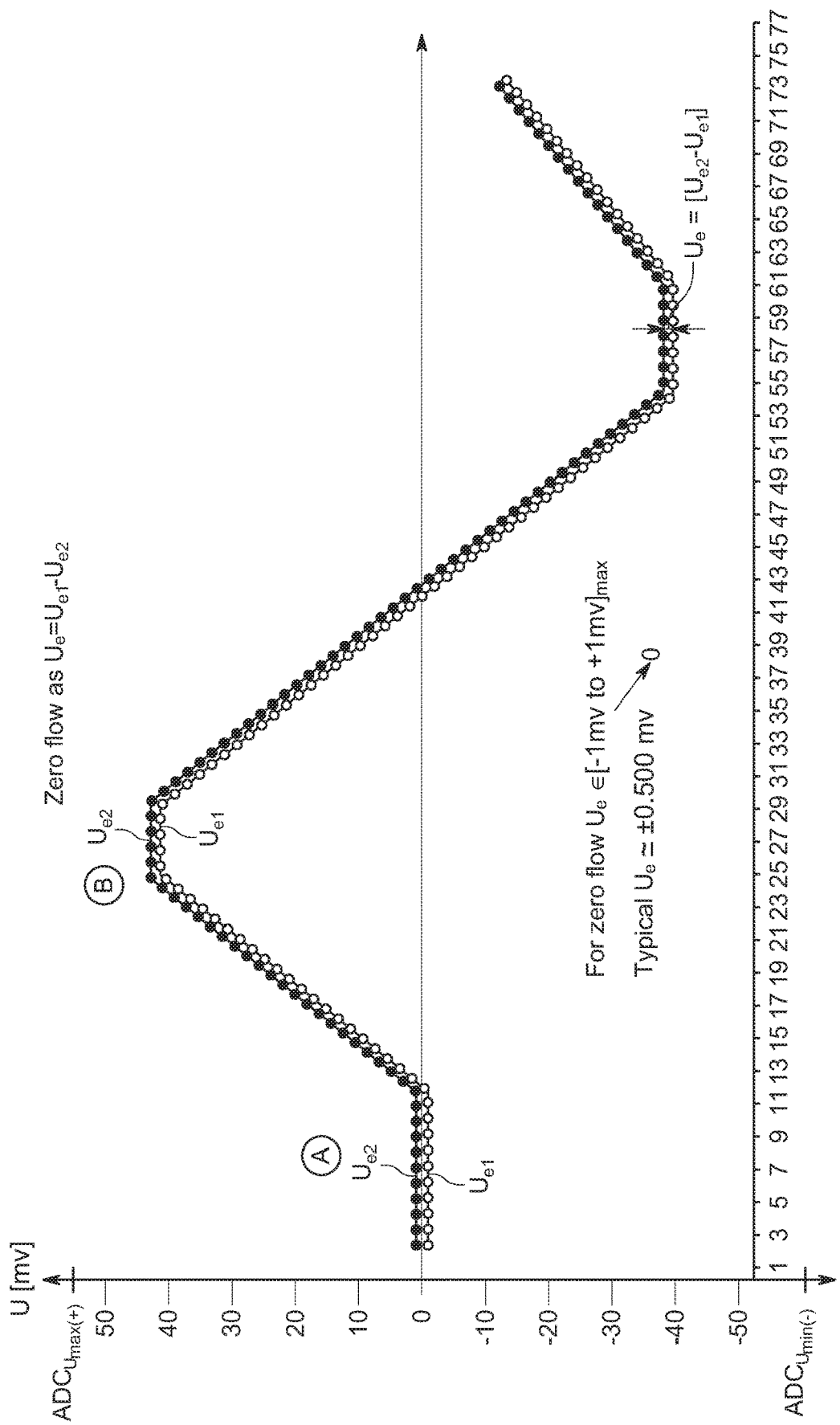
FIG. 2 illustrates a time varying voltage signal for a stagnant fluid, depicting an ideal depiction of the voltage signal for a stagnant fluid, and a typical depiction of the voltage signal for a stagnant fluid.
Figure 3:
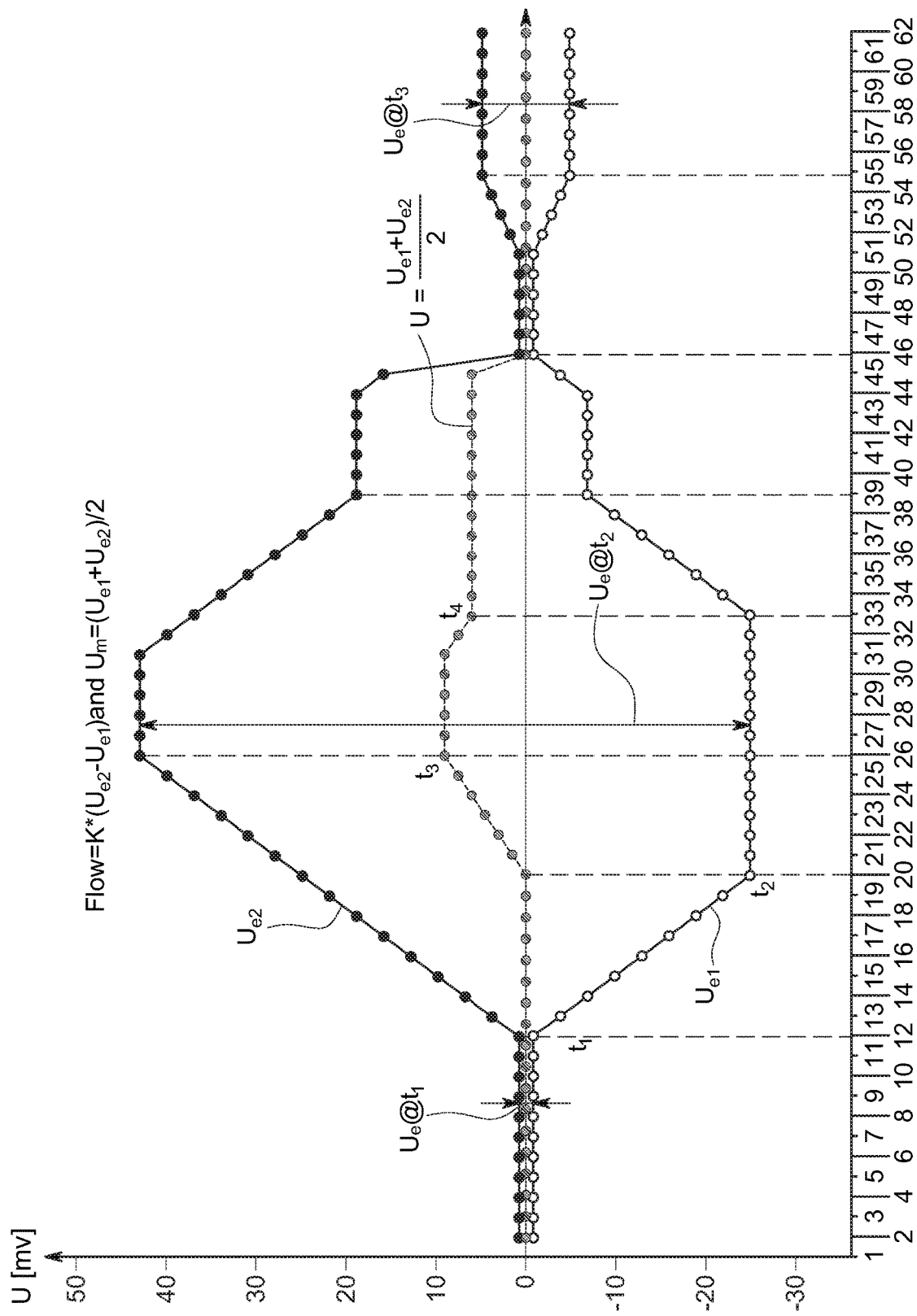
FIG. 3 illustrates a time varying voltage signal for a fluid flowing within a magnetic flowmeter, depicting the voltage potential measured by a pair of electrodes.

Referring now to FIGS. 2-3, a graphical representation is shown depicting the induced voltage Ue when the fluid is stagnant (FIG. 2), and when the fluid is flowing (FIG. 3). When the fluid is stagnant, ideally, the electrode potentials, $Ue_1$ and $Ue_2$, are very close to zero, and thus Ue is also close to zero (section A of FIG. 2). However, in reality, even when the fluid is stagnant, the electrode potentials are not close to zero, and they move in tandem as they are both in contact with the fluid potential (section B of FIG. 2). Once the fluid begins to flow through the fluid flow path, such that the velocity is no longer zero, the two electrode potentials $Ue_1$ and $Ue_2$ begin to move away from each other (FIG. 3), thereby creating an induced voltage, which is proportional with the flow at each moment on the time axes (t1, t2, t3 . . . ).

Magnetic flow meters are generally very accurate (e.g., <1% measurement error). However, as Faraday's equation illustrates, inadvertent variations in the magnetic field strength B or induced voltage can cause significant errors in the fluid velocity measurement. As aforementioned, conditions such as variations in the fluid flow profile, or EMI/EMC interference, can directly or indirectly impact the voltage potentials measured by the electrodes.

Figure 4:
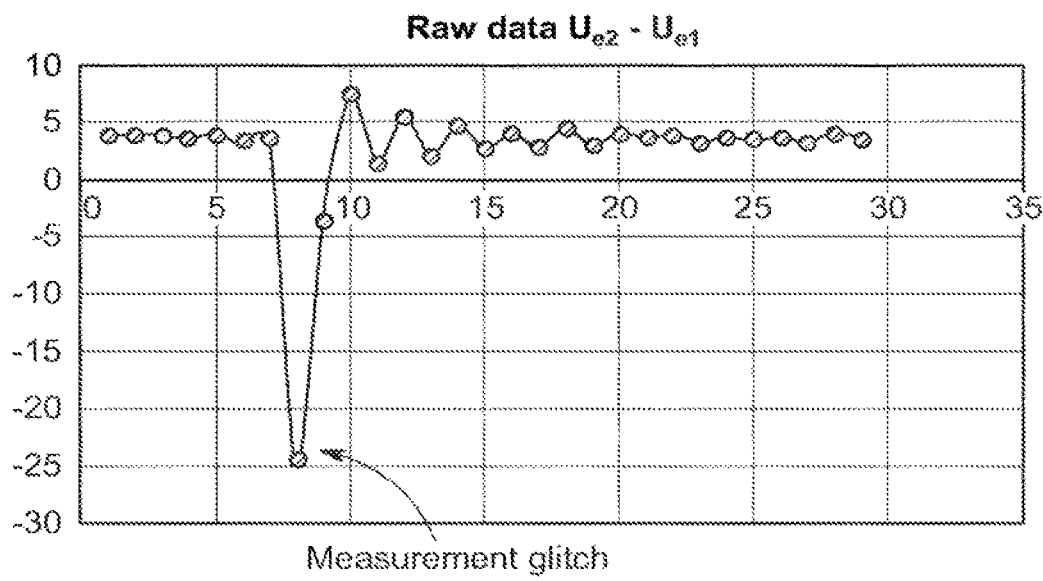
FIG. 4 depicts a published voltage signal of a fluid flow impacted by the occurrence of a measurement glitch.

Referring now to FIG. 4, there is shown the impact to the voltage signal Ue due to the presence of a measurement glitch, which in this example, is caused due to the fluid splashing out of sync about the electrodes (26, 28). More particularly, the graph of FIG. 4 depicts the difference between $Ue_1$ and $Ue_2$, over time, as measured. In the exemplary embodiment, measurements are taken every 100 ms. As depicted, there is a significant deviation between the actual Ue measured, and the occurrence of a measurement glitch, which will significantly impact the fluid flow velocity computed. Moreover, as depicted, it is apparent that the measured Ue will oscillate for a period of time before returning to the actual measured value of Ue, thereby prolonging the impact of the measurement glitch on the fluid flow velocity.

Figure 5:
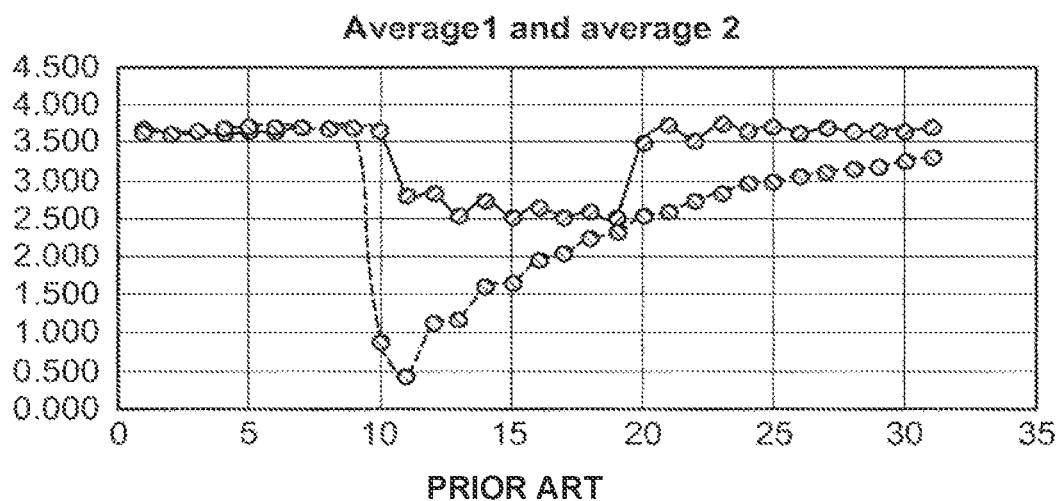
FIG. 5 depicts an existing filtering method for correcting a voltage signal impacted by the occurrence of a measurement glitch.

Referring now to FIG. 5, an existing filtering method is shown for correcting such measurement glitches, by normalizing an average calculated Ue, thereby reducing the impact of the measurement glitch. But as depicted, a significant margin of error still exists, and thus does not minimize the impact of the observed measurement glitch. More particularly, the graph of FIG. 5 depicts the application of filtering method (e.g., IIR and FIR) to $Ue_1$ and $Ue_2$, over time.

Figure 6:
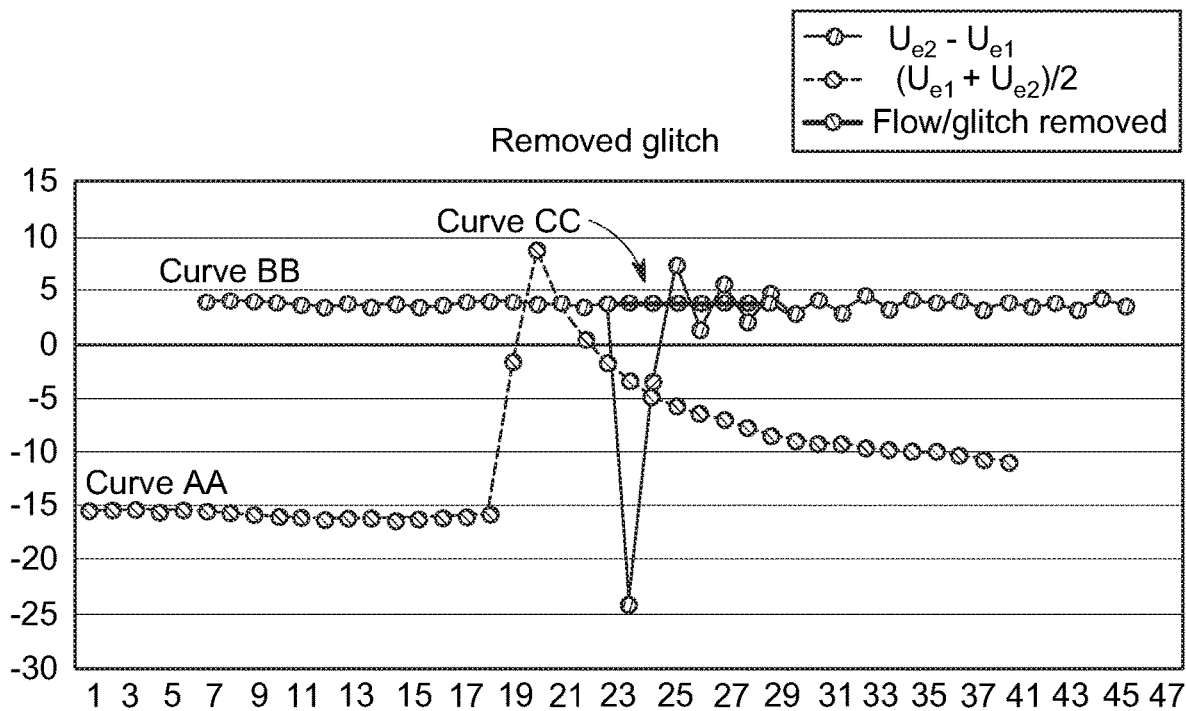
FIG. 6 depicts the occurrence of a measurement glitch for a fluid flow, illustrating the impact on the glitch detection variable, and illustrating the actual voltage signal on a prescribed delay, as well as the corrective measure applied by the flowmeter.

Referring now to FIG. 6, a graphical representation of the flowmeter 10 correcting the voltage signal Ue for a detected measurement glitch is depicted. In detecting a measurement glitch, the flowmeter computes a glitch detection variable, Um, via another signal conditioning path, wherein Um is based on the first and second electrode potentials, specifically:

$$Um=(Ue_1+Ue_2)/2$$

The glitch detection variable Um is continuously computed and processed by a second signal processor, including being sent as a digital signal to the micro-processor 36 with the corresponding determined voltage signal Ue. Using the glitch detection variable Um, the micro-processor is configured to detect for the presence of a measurement glitch by monitoring for any step size changes in Um that significantly deviate from the preceding trend. Upon detecting a step size change, the micro-processor is configured to remove the corresponding Ue from being considered for the fluid velocity calculation, and instead the preceding Ue is used (as determined prior to the occurrence of the measurement glitch), acting as a gap filler for the removed Ue. Moreover, considering that the measurement glitch may result in the voltage signal oscillating for a number of measurement intervals, the gap filler Ue may essentially be "frozen" and used for a prescribed number of measurement intervals in calculating the fluid flow velocity. As such, by maintaining the same gap filler Ue for a number of measurement intervals, the impact of a measurement glitch on the calculated fluid velocity is minimized or eliminated.

The criteria for identifying a measurement glitch based on a step size change in the glitch detection variable can be based on various data analytical means. In an exemplary embodiment, the step size change can be based on percent (%) change in Um from a preceding value, wherein a minimum percent change is identified as a threshold. In addition to or alternatively, a step size change may be identified based on the absolute value of Um changing beyond a prescribed threshold.

Referring to FIG. 6, and in an exemplary embodiment, the micro-processor monitors the glitch detection variable Um in real-time, while the voltage signal Ue considered and published for the fluid flow velocity calculation is on a prescribed delay, e.g., a prescribed time delay, prescribed number of measurement intervals, and so on. It should be noted that the electrode potentials ($Ue_1$ and $Ue_2$) considered for the glitch detection variable Um and voltage signal Ue are the same, i.e. based on the same instantaneous moment, however both values are published at different times. As such, this prescribed delay enables the micro-processor to detect for the presence of measurement glitches, and subsequently apply any corrective measures as needed, so as to ensure the published voltage and velocity are not skewed due to any deviations detected. In an exemplary embodiment, the prescribed delay in publishing voltage signal can be 200 milliseconds With continued reference to FIG. 6, curve AA represents the glitch detection variable Um, wherein a spike is clearly visible at the 19 ms mark on the time axes. As depicted by curve BB, the voltage signal Ue, published on a 4 ms delay after Um is computed, and without any corrective measures applied, significantly deviates from the actual Ue value based on the preceding trend. As such, curve CC represents the corrective measured applied by the micro-processor, wherein the voltage signal Ue just prior to the measurement glitch is used for several measurement intervals. Moreover, as noted by curve BB, the voltage signal continued to slightly oscillate until the 35 ms point, but it is apparent that the impact was minimal when comparing to the actual voltage signal preceding and following the measurement glitch.

Figure 7:
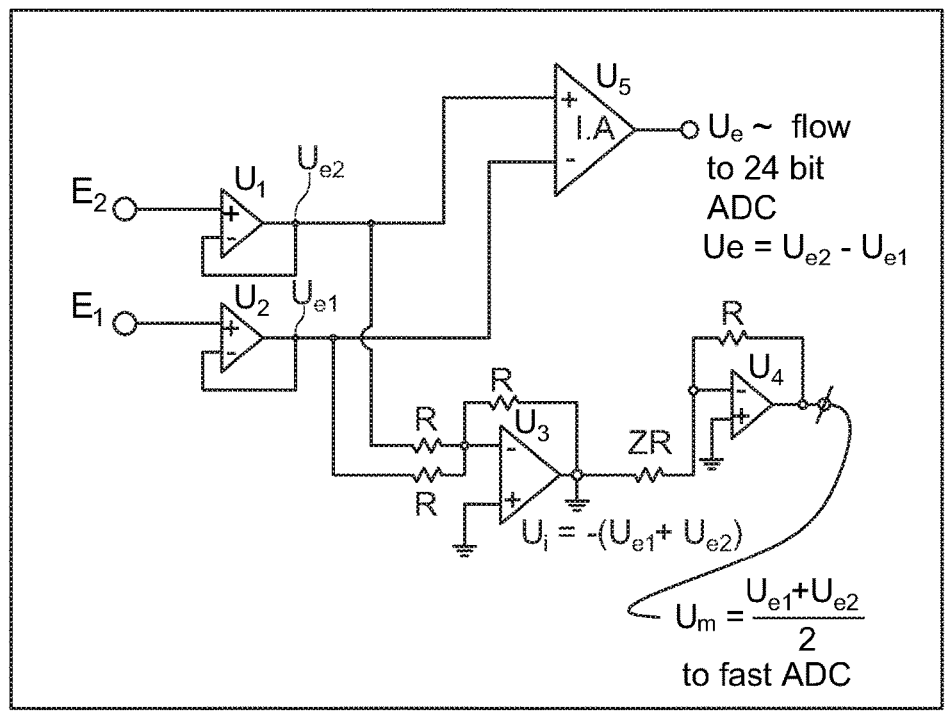
FIG. 7 depicts the signal conditioning path for a flowmeter in detecting and correcting the fluid velocity using a fast analog-to-digital converter, thereby minimizing the delay in publishing the voltage signal.

With reference now to FIG. 7, an alternate means for a flowmeter assembly to correct a computed fluid flow velocity is depicted, wherein an aforementioned delay in publishing the voltage signal Ue can be minimized by using a fast analog-to-digital converter (ADC). Specifically, a pair of op amps are used to sum the electrode potentials ($Ue_1$ and $Ue_2$), such that the fast ADC is configured to compute the glitch detection variable Um, and identify a step-size change based on a prescribed threshold detected.

The exemplary embodiment depicts a full-bore magnetic flowmeter, but the glitch detection system can be incorporated in other types of magnetic flowmeters, e.g., insertion mag-meters.

Figure 8:
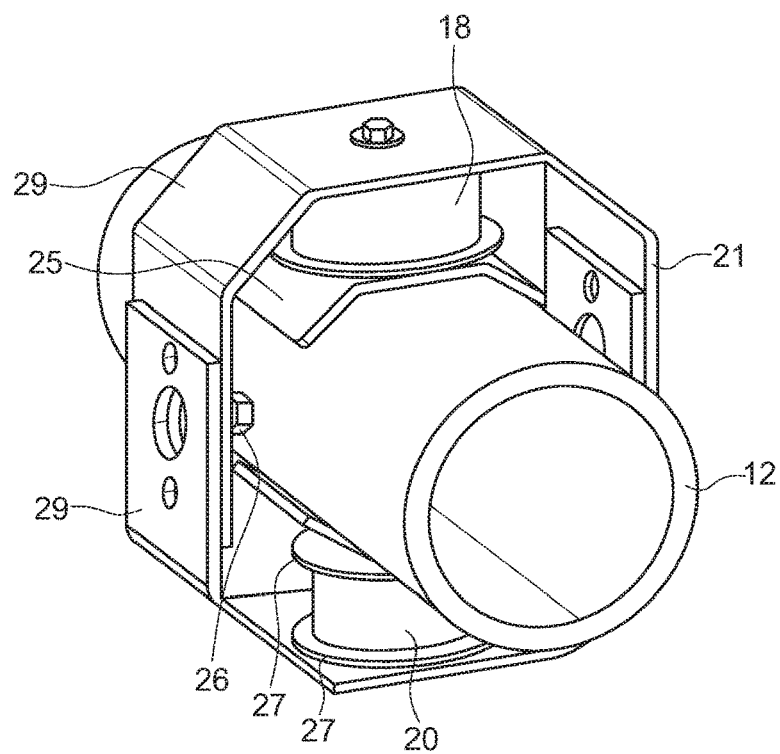
FIG. 8 is a simplified perspective view of a magnetic flowmeter assembly in accordance with the present invention, including a brace coupled to a pair of coils forming magnetic circuity circumscribing the pipe.

With reference now to FIG. 8, in an exemplary embodiment, the coil assemblies 18, 20 are coupled to a tubular body (pipe) 12 in an intermediate region thereof. The coil assemblies are mounted external to the pipe, aligned along the axis (Az). More particularly, each coil is held in place by a brace 21 that circumscribes the pipe 12. A magnetic pole 25 is disposed between the coil 18 and the pipe. The magnetic pole is formed of conductive material, e.g., metal same as the magnetic brace, soft magnetic Carbon Steel with Fe %>99.4, and shaped to conform about the pipe. Non-conductive (airgap) shims 27 are disposed on opposing ends of the coils. With each coil, a first airgap shim 27 is sandwiched between the coil and the corresponding magnetic pole 25, and a second airgap shim 27 is sandwiched between the coil and the brace 21. In each coil, there is a core made of a material with good magnetic properties. These cores are transferring the flux lines from the coils into the pole shoes and the magnetic brace.

The brace 21 further serves as magnetic circuitry for the magnetic field generated by the coils (18, 20), which conducts the magnetic field going outwards the pipe to be added to the magnetic field going inwards. The brace has a generally octagonal shape, which benefits assembly and operation of the assembly 10. More particularly, the brace 21 is formed of two, generally c-shaped components 29 that slidably mate with each other about the pipe, to couple to each other. In this manner, the brace 21 can be used on pipes having different diameters. Attachments (e.g., bolts) couple the coils to the brace along the axis (Az).

The assembly 10 is configured to generate a strong alternating magnetic field (flux) B that is distributed evenly over the pipe cross-section. Utilizing an alternating magnetic field avoids electrode material migration. Configuration of the brace 21, e.g., including shape and materials, facilitates the resulting magnetic field (flux) B within the pipe 12. In the exemplary embodiment the brace 21 is formed of "soft" magnetic materials, such as soft ferrous material, which refers to relative permeability, meaning it has no remnant magnetization, when shut down. As such, magnetic losses are minimized for the magnetic field going outwards from the pipe and added to the magnetic field going inwards to the pipe.

With reference now to FIG. 9, the assembly 10 further includes a housing 38 configured to protect the magnetic field generator (which includes the coils 18, 20 and the brace 21), from environmental exposure. The assembly 10 further includes an electronics assembly 40 attached to the housing of the assembly. The electronics assembly is in electrical communication with the electrodes (26, 28) and the coil assemblies (18, 20) to operate the assembly 10. In an exemplary embodiment, electronics assembly can house components such as coil drivers, op amps, analog-to-digital converters (ADC), processors (e.g., signal processor, micro-processors), among others.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A method for operating a magnetic flowmeter, the flowmeter configured to measure a velocity of a conductive fluid in a flow path, the method comprising:
   driving at least one coil assembly with a drive current provided by a coil driver, the at least one coil assembly located adjacent to the fluid flow path;
   measuring a voltage value ($Ue_1$, $Ue_2$) in the fluid flow path, via a pair of electrodes, such that the flowmeter is configured to:
   (a) compute a reference voltage value (Um) based upon signal voltages from the pair of electrodes, the reference voltage value $(Um)=(Ue_1+Ue_2)/2$;
   (b) detect a glitch with the measured voltage value, based on Um having a value outside a prescribed range due to a difference between the signal voltages ($Ue_1$ and $Ue_2$) exceeding a predetermined difference; and
   (c) compute an induced voltage value $Ue=Ue_2-Ue_1$;
   detecting an outlier voltage value in a form of the glitch from the measured voltage value;
   correcting the measured voltage value by negating the outlier voltage value, so as to fix the measured voltage value as measured prior to the detection of the outlier voltage value, the measured voltage value fixed for a pre-determined period of time at the prior measured voltage value to enable the voltage value in the fluid flow path to stabilize; and
   determining a corrected fluid velocity measurement from a calculated induced voltage value, the corrected fluid velocity and calculated induced voltage value being corrected for the outlier voltage value.

2. The method as defined in claim 1, wherein the calculated induced voltage value is determined a prescribed time after measuring the voltage value, such that the flowmeter calculates the corrected fluid velocity measurement on a prescribed time delay.

3. The method as defined in claim 2, wherein the outlier voltage value is determined by a Analog to Digital Converter (ADC).

4. A device for operating a flowmeter configured to measure the velocity of a conductive fluid in a flow path, the device comprising:
- a coil assembly circuit configured to generate a magnetic field proximate the fluid flow path, the coil assembly comprising:
  - at least one coil assembly;
  - a voltage source configured to provide a voltage output; and
  - a coil driver configured to provide a drive current to the at least one coil assembly based on the voltage output;
- a pair of electrodes configured to measure a voltage value proximate the fluid flow path including a first electrode configured to measure a first measured voltage value (Ue1) and a second electrode configured to measure a second measured voltage value (Ue2); and
- a computer processor configured to:
  - receive the first measured voltage value (Ue1) and receive the second measured voltage value (Ue2);
  - compute a reference voltage value (Um) based upon the first measured voltage value ($Ue_1$) and the second measured voltage value ($Ue_2$), the reference voltage value (Um)=($Ue_1$+$Ue_2$)/2;
  - detect an outlier voltage value from the measured voltage value based on the reference voltage value (Um) having a value outside a prescribed range due to a difference between Ue1 and Ue2 exceeding a predetermined difference;
  - correct the measured voltage value by negating the outlier voltage value, so as to fix the measured voltage value as measured prior to the detection of the outlier voltage value, the measured voltage value fixed for a predetermined period of time at the prior measured voltage value to enable the voltage value in the fluid flow path to stabilize; and
  - determine a corrected fluid velocity measurement from a calculated induced voltage value, the corrected fluid velocity and calculated induced voltage value being corrected for the outlier voltage value.

5. The device as defined in claim 4, wherein the computer processor drives the first and voltage sources to non-zero potentials such that the magnitude of the voltage inducted in the first coil assembly equals the magnitude of the voltage induced in the second coil assembly.

6. The device as defined in claim 4, wherein the computer processor is further configured to monitor the zero-flow measurement value to detect performance changes of the magnetic coil assemblies.

7. The device as defined in claim 4, wherein the computer processor is further configured to monitor the zero-flow measurement value to detect grounding changes of the fluid media.

8. The device as defined in claim 4, wherein the computer processor is further configured to monitor the zero-flow measurement value to detect changes in the conductive fluid's electrical potential.

* * * * *

UNITED STATES PATENT AND TRADEMARK OFFICE
CERTIFICATE OF CORRECTION

PATENT NO. : 11,131,571 B2
APPLICATION NO. : 16/518108
DATED : September 28, 2021
INVENTOR(S) : Calin Ciobanu et al.

It is certified that error appears in the above-identified patent and that said Letters Patent is hereby corrected as shown below:

On the Title Page

Item (73)   "Assignee: Georg Fischer Signett LLC" should be
--Georg Fischer Signet LLC--

Signed and Sealed this
Twenty-third Day of August, 2022

Katherine Kelly Vidal
*Director of the United States Patent and Trademark Office*